(12) United States Patent
Costabello et al.

(10) Patent No.: US 10,803,394 B2
(45) Date of Patent: Oct. 13, 2020

(54) INTEGRATED MONITORING AND COMMUNICATIONS SYSTEM USING KNOWLEDGE GRAPH BASED EXPLANATORY EQUIPMENT MANAGEMENT

(71) Applicant: ACCENTURE GLOBAL SOLUTIONS LIMITED, Dublin (IE)

(72) Inventors: Luca Costabello, Newbridge (IE); Penelope Tsatsoulis, Dublin (IE); Utsab Barman, Coochbehar (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 272 days.

(21) Appl. No.: 15/923,738

(22) Filed: Mar. 16, 2018

(65) Prior Publication Data
US 2019/0287006 A1 Sep. 19, 2019

(51) Int. Cl.
| | | |
|---|---|---|
| *G06F 16/25* | (2019.01) | |
| *G06F 16/901* | (2019.01) | |
| *G06F 16/9038* | (2019.01) | |
| *G06F 16/532* | (2019.01) | |
| *G06F 16/632* | (2019.01) | |
| *G06F 16/2452* | (2019.01) | |

(Continued)

(52) U.S. Cl.
CPC ........... *G06N 5/045* (2013.01); *G06F 16/254* (2019.01); *G06F 16/9024* (2019.01); *G06F 16/9038* (2019.01); *H04L 67/12* (2013.01); *G06F 16/24522* (2019.01); *G06F 16/532* (2019.01); *G06F 16/632* (2019.01)

(58) Field of Classification Search
CPC ............. G06F 16/9024; G06F 16/9038; G06F 16/3329; G06F 16/90332; G06F 16/9535; G06F 16/242; G06F 16/243; G06F 16/24522; G06F 16/248; G06F 16/288
USPC ................................ 707/707, 723, 735, 798
See application file for complete search history.

(56) References Cited

U.S. PATENT DOCUMENTS

| | | | | |
|---|---|---|---|---|
| 2014/0046934 A1* | 2/2014 | Zhou | ................. | G06F 16/24526 707/723 |
| 2015/0095303 A1* | 4/2015 | Sonmez | ................. | G06N 5/003 707/707 |
| 2018/0075359 A1* | 3/2018 | Brennan | ................. | G06N 5/022 |

(Continued)

*Primary Examiner* — Dangelino N Gortayo
(74) *Attorney, Agent, or Firm* — Mannava & Kang, P.C.

(57) ABSTRACT

A system for providing integrated monitoring and communications of diagnostic equipment is disclosed. The system may comprise a data access interface, a processor, and an output interface. The data access interface may receive heterogeneous data from a plurality of machine and sensor equipment associated with performance of a system or product. The data access interface may also to receive a user inquiry pertaining to the system and product. The processor may generate a knowledge graph based on the data associated with the system or product, as well as convert the user inquiry into a knowledge graph query by: extracting entities from the user inquiry; extracting relations from the user inquiry to identify relationships between entities; expanding the user inquiry using the knowledge graph and the entities and relations; and translating the inquiry into knowledge graph triples. The processor may then identify relevant nodes and edges based on the knowledge graph query and the knowledge graph, and determine an answer to the user inquiry.

22 Claims, 10 Drawing Sheets

(51) Int. Cl.
*G06N 5/04* (2006.01)
*H04L 29/08* (2006.01)

(56) References Cited

U.S. PATENT DOCUMENTS

| | | | |
|---|---|---|---|
| 2019/0057145 A1* | 2/2019 | Huang | G06F 16/9024 |
| 2019/0065627 A1* | 2/2019 | De Mel | G06F 16/9038 |
| 2019/0108226 A1* | 4/2019 | Boxwell | G06F 16/93 |
| 2019/0236205 A1* | 8/2019 | Jia | G06F 16/90332 |

* cited by examiner

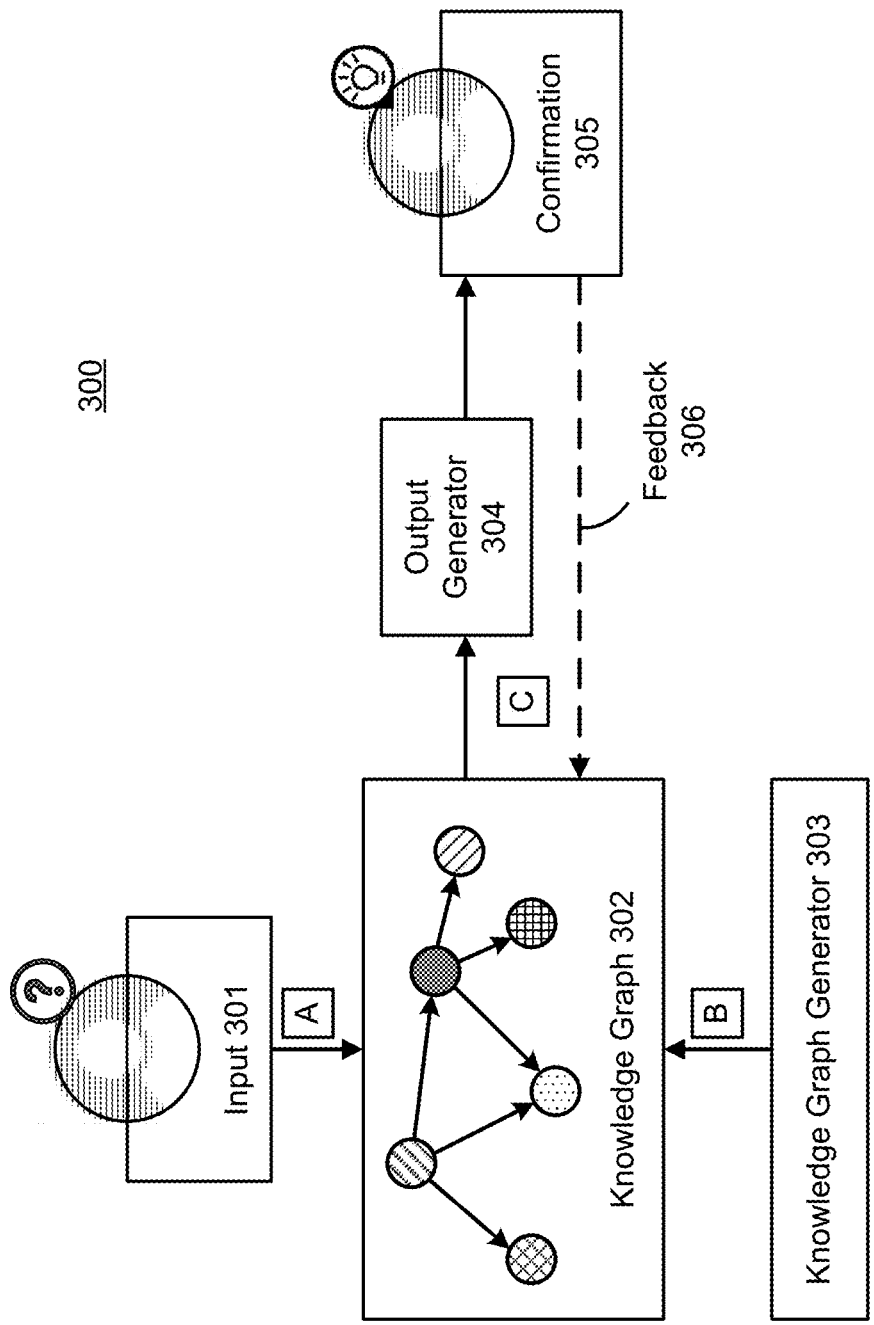

Qx: "Why is there a bad smell in Room B?"  Relations = {in}
Entities = {smell bad, Room B}

401
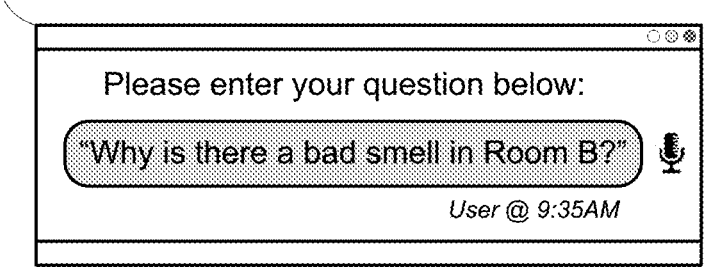
612
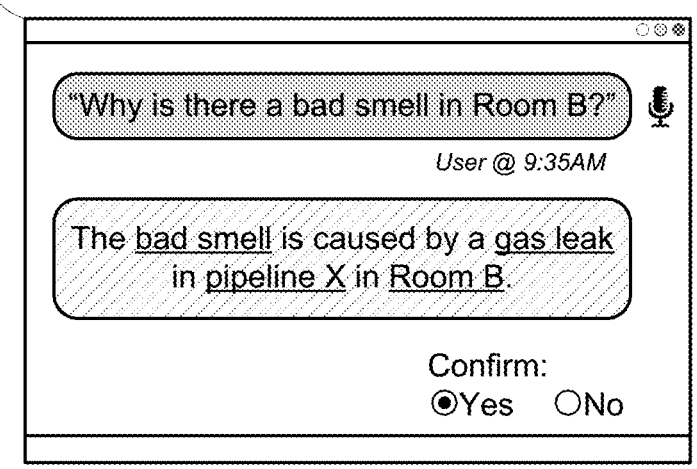
FIG. 6B

INTEGRATED MONITORING AND COMMUNICATIONS SYSTEM USING KNOWLEDGE GRAPH BASED EXPLANATORY EQUIPMENT MANAGEMENT

TECHNICAL FIELD

This patent application relates generally to diagnostic equipment monitoring and management, and more specifically, to systems and methods for integrated monitoring and communications using knowledge graph based explanatory equipment management.

BACKGROUND

In an Internet of Things (IoT) environment, many things are equipped with diagnostic equipment that acquire and collect information. Factories, homes, vehicles, schools, and hospitals, for example, may each be equipped with hundreds, if not thousands, of machine or sensor equipment that amass large quantities of information about health, performance, or maintenance requirements of these specific environments or products. This accumulated data may be stored, exchanged, and used to increase efficiencies, enhance situational awareness, and drive connected computing.

A technical problem associated with traditional models is that the focus has largely been centered around collecting large amounts of data while providing limited analytics. Because of these limitations, development and advances in edge computing, for example, have grown to preserve privacy, reduce latency, and improve real-time data exchange and processing. Edge computing, however, does not fully address all issues associated with asset maintenance and management. For example, it has become increasingly challenging to leverage the vast collection of acquired data to create genuinely "smart" environments and products that can self-monitor, self-diagnose, and augment and facilitate human-machine interactions. Conventional systems especially lack an ability to adequately process, transform, and utilize the ever-increasing wealth of information to make a more immediate and more meaningful impact on asset management actions.

In asset management, there is no simple and intuitive way to ascertain a cause for a specific or complicated problem. For example, if a factory system fails, information from machine and sensor equipment can be used to see that the failure is the result of power loss. The operator may look to the machine and sensor equipment data and set some control thresholds in order to predict when a future failure may occur. But if a problem at a factory is more nuanced, say an unfamiliar odor appears to be emanating from a particular room in that factory, traditional systems for predictive asset management may not provide an easy way to identify or diagnose this problem. As one could imagine, there may be a number of causes for this smell. And if the smell is harmful to people or the factory, it would be important to discover and resolve the issue.

Yet another technical problem is that there is no way for a factory operator in this example to inquire about this issue other than to scour any and all alerts from the multitude of diagnostic equipment data. Even though the data being collected from all the machines and sensors, together with other sources, should be able to provide an answer to the operator's question, there is no simple way for the operator to have a meaningful human-machine interaction to inquire about this issue and determine the cause for this problem. Traditional systems do not provide any type of intuitive interactive interface for the operator to submit his or her inquiry and determine what is causing this smell or other complicated problem.

As a result, a more robust approach may be needed to provide an integrated monitoring and communications using knowledge graph based explanatory equipment management.

BRIEF DESCRIPTION OF DRAWINGS

Features of the present disclosure are illustrated by way of example and not limited in the following Figure(s), in which like numerals indicate like elements, in which:

FIG. 3 illustrates a data flow diagram for knowledge graph based explanatory equipment management, according to an example;

FIG. 6B illustrates an output visual for knowledge graph output generation, according to an example.

DETAILED DESCRIPTION

Figure 1:
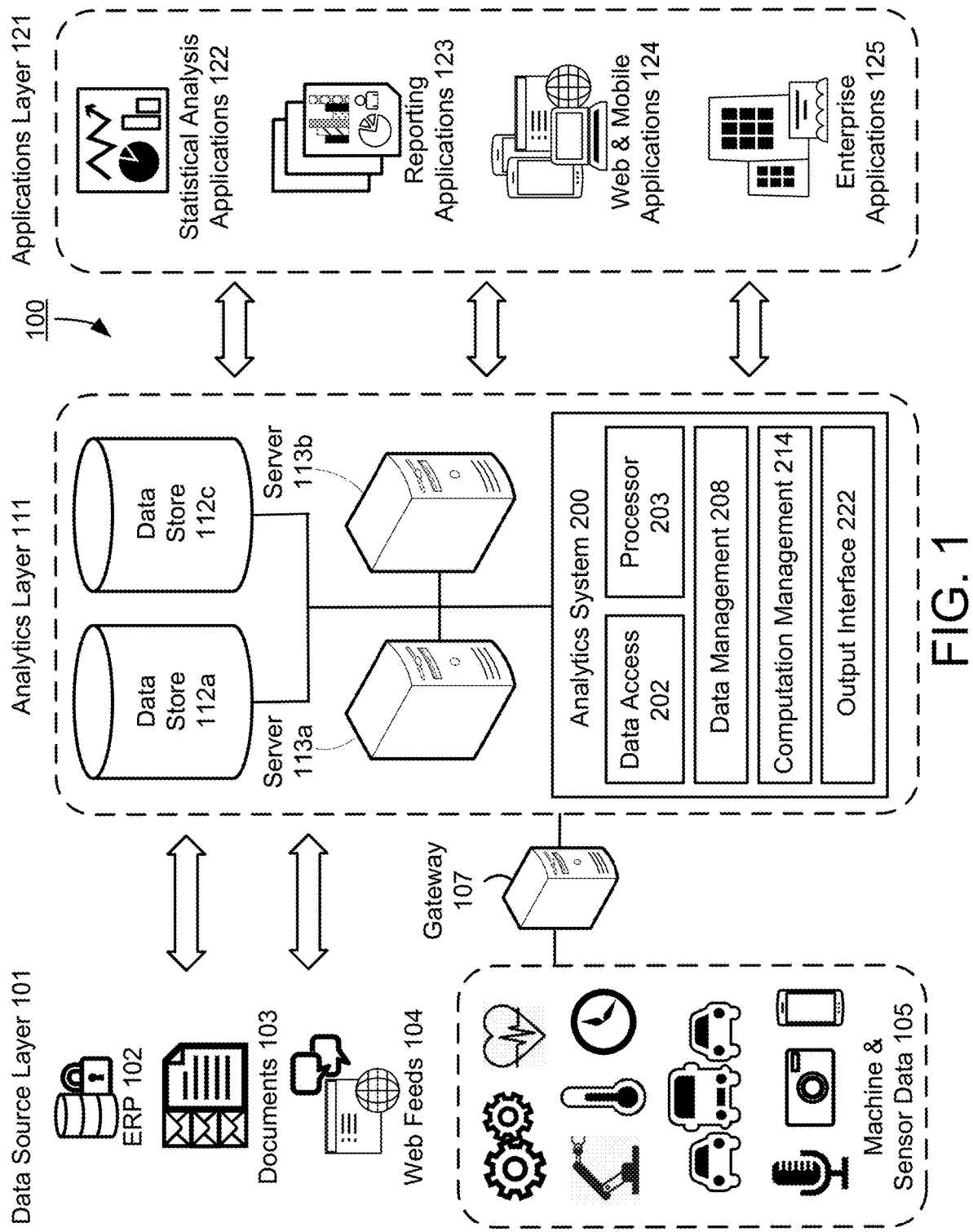
FIG. 1 illustrates an integrated monitoring and communications system using knowledge graph based explanatory equipment management, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As discussed above, factories, homes, vehicles, schools, stores, and hospitals, are all becoming "smarter." Hundreds, if not thousands, of machine or sensor equipment are collecting information about health, performance, or maintenance requirements of these various environments or products to increase efficiencies, enhance security, and offer innumerable Internet of Things (IoT) capabilities.

Unfortunately, technological advances have largely focused on collecting large amounts of data while providing only limited data analytics. Edge computing has grown recently to preserve privacy, reduce latency, and improve real-time data exchange and processing, but has not fully addressed all the issues associated with asset maintenance and management. Conventional systems generally do not leverage all the collected and acquired information to create "smart" environments and products that can, for example, self-monitor, self-diagnose, and augment human-machine interactions. Gathering large amounts of data may no longer be enough unless viable techniques and solutions are implemented to adequately process, transform, and utilize this information for meaningful impact on asset management actions.

As described herein, an integrated monitoring and communications using knowledge graph based explanatory equipment management may be provided. The integrated monitoring and communications system may provide a simpler and more intuitive way to ascertain a cause for a specific and complicated problem. For example, in a factory setting, there may be an unfamiliar odor emanating from a particular room in that factory. The integrated monitoring and communications system may provide more meaningful human-machine interaction for a user, such as a factory operator or manager, to determine the cause for this problem. A factory operator, for example, may carry a mobile device that is connected with an analytics system of the integrated monitoring and communications system, which in turn is part of a network connected to a variety of machine and sensor equipment. The mobile device may provide an interface for the factory operator to easily input his or her specific question: "Why is there a bad smell in Room B?" Using natural language processing (NLP) techniques, generating and updating knowledge graphs, incorporating heterogeneous data, and providing output confirmation and feedback, the integrated monitoring and communications may process the wealth of available data and provide an explanatory assessment of this issue. In this case, the integrated monitoring and communications system, in response to the factory operator's inquiry, may provide a response—in audio, text, and/or pictorial form—that the reason for the bad smell in Room B is because of a gas leak.

It should be appreciated that the techniques described herein may expand on this example or use other examples for the purposes of highlighting how the integrated monitoring and communications system using knowledge graph based explanatory equipment management may be provided.

FIG. 1 illustrates an integrated monitoring and communications system using knowledge graph based explanatory equipment management, according to an example. The integrated monitoring and communications system 100 may be used to monitor and analyze data. In particular, the integrated monitoring and communications system 100 may capture data from a data source layer 101 or from other sources and provide predictive analytics using knowledge graph based explanatory equipment management at an analytics system 200.

The integrated monitoring and communications system 100 may operate in a network or an enterprise IoT environment where data is exchanged. More specifically, the integrated monitoring and communications system 100 may provide real-time or near real-time monitoring and analysis of diagnostic equipment of one or more sites or products. The integrated monitoring and communications system 100 may include a data source layer 101, an analytics layer 111, and an applications layer 121. The data source layer 101 may include systems, subsystems, applications, and/or interfaces to collect information from a variety of sources. These may include, but not limited to, enterprise resource planning (ERP) systems and applications 102 (hereinafter "ERP"), documents 103, web feeds 104, and machine and sensor data 105 (hereinafter "sensor data"), all of which may be distinct or integrated with the integrated monitoring and communications system 100. The data source layer 101 may include other data or information sources as well. It should be appreciated that each of these data sources may further include its own data feed, storage, system, application, or other source for collecting and sending data and information, including third party or indirect sources.

The ERP 102 may include one or more application servers that host various ERP applications. These may include, for example, a customer relationship management (CRM) platform, system, or application. The ERP 102 may collect, store, manage, and interpret data associated with various enterprise functions or activities. The ERP 102 may provide an integrated and continuously updated view of core business processes using common databases maintained by a database management system. The ERP 102 may track enterprise resources (e.g., cash, raw materials, production capacity, etc.) as well as other information, such as corporate or business transactions (e.g., orders, purchase orders, payroll, etc.). Furthermore, the applications that make up the ERP 102 may share data across various departments (e.g., manufacturing, purchasing, sales, accounting, etc.) that provide the data. The ERP 102 may facilitate information flow between many enterprise functions and may manage communications with stakeholders or other parties. The ERP 102 may contain a large amount of information that could be used to enhance meaning of other data sources.

The documents 103 may provide another source of data. Data received at the documents 103 may include files, emails, faxes, scans, or other documents that are transmitted, received, and stored in an enterprise environment. This may also include owner's manuals for products or systems or other documentation or communicated information.

The web feeds 104 may be yet another source of data. Data received at the web feeds 104 may include data from various web sources, such as social media, syndication, aggregators, or from scraping. This may also include RSS feeds, which allow users to access updates to online content. Data from social media may also include any type of internet-based application built upon creation and exchange of user-generated content, which may include information collected from social networking, microblogging, photo-sharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing.

The machine and sensor data 105 may be another source of data and information. In an IoT environment, many systems and products are equipped with numerous sensors or diagnostic equipment that may provide a plethora of machine and sensor data 105. There may be a number of physical devices, vehicles, appliances, systems, or products that are equipped with electronics, software, and sensors, where most, if not all, of these items may be connected to a network and share some measure of connectivity with each other. This may enable these and other pieces of equipment to communicate and exchange data. This may also allow various systems, objects, and items to be detected, sensed, or remotely controlled over one or more networks, creating a vast array of asset management functionalities. These may include abilities to provide data analytics on equipment, assessment of equipment health or performance, improved efficiency, increased accuracy or function, economic benefit, reduction of human error, etc. Together with other technologies and systems, the machine and sensor data 105 may help enable the integrated monitoring and communications system 100 provide predictive analytics using knowledge graph based explanatory equipment management.

It should be appreciated that the data source layer 101 may also include geolocation data either as part of the web feeds 104 or machine and sensor data 105. Geolocation data may include information or data associated with identification or estimation of real-world geographic location of an object, such as a radar source, mobile device, or web-based computer or processing device. Geolocation data may provide specific geographic coordinates or data that may be used for monitoring location, distinct or together with, other various positioning systems or applications. For example, the geolocation data may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data may include other self-disclosing or self-identifying information, including but not limited to country, region county, city, postal/zip code, latitude, longitude, time zone, domain name, connection speed, Internet Service Provider (ISP), language, proxies, or other information that can be used to piece together and trace location. This and other data in the data source layer 101 may be collected, monitored, and analyzed to provide predictive analytics using knowledge graph based explanatory equipment management.

It should also be appreciated that the integrated monitoring and communications system 100 may also provide a gateway 107. In an example, the gateway 107 may provide edge computing for the machine and sensor data 105. The gateway 107 may sit at an "edge" of the data source layer 101 or local network, and function as an intermediary before transmitting data to the analytics layer 111. The gateway 107 may perform and run analytics in order to decrease time, expense in data delivery, and perhaps even taking immediate action at equipment to which the sensors are attached. In many ways, the gateway 107 may provide real-time or near real-time analytics at the edge to simplify the analytics process and increase responsiveness and efficiency. The gateway 107 may be physical or virtual element and may be configured for compact or full implementation. When devices and sensors send data to the gateway 107, this data may be initially parsed and, depending on the rules and actions that are configured, some critical and time-saving analytics may be immediately performed right at the gateway itself. This may save time, energy, and costs associated with full transmission of data to the analytics layer 111. While depicted in FIG. 1, it should be noted that the gateway 107 may operate in partial or full capacity, or it may be removed entirely. It should also be appreciated that data analytics and processing techniques described below with respect to the analytics layer 111 may also be performed partially or in full by the gateway 107.

The analytics layer 111 may collect, manage, process, and analyze information and data from the data source layer 101 and the applications layer 121. The analytics layer 111 may be within general control of an enterprise, such as an organizational entity conducting operations, business, or other related activities. This may be an organization that operates one or more factories, fleets of vehicles, chains of stores or restaurants, etc. In order to conduct business operations in an IoT environment, the analytics layer 111 of the integrated monitoring and communications system 100 may include one or more data stores, one or more servers, and other elements to process data for its organizational purposes.

For example, the analytics layer 111 may include data stores 112a and 112b. In an example, the data store 112a may be a data management store and may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource.

In another example, the data store 112b may be and operational data store and may store information and data associated with operational reporting, controls, and decision-making. The operational data store may be designed to integrate data from multiple sources for additional operations on that data, for example, in reporting, controls, and operational decision support. Integration of data at the operational data store may involve cleaning, resolving redundancy, checking against business rules, and other data integration techniques, such as data virtualization, federation, and extract, transform, and load (ETL). The operational data store may also be a source of data for an additional data stores in the integrated monitoring and communications system 100.

The analytics layer 111 may also include other data stores, such as an enterprise data store (not shown), which may be used for tactical and strategic decision support. For example, an enterprise data store may store information and data associated with reporting and data analysis, and may be instrumental to various business intelligence functions. The enterprise data store may be one or more repositories of integrated data (e.g., from the operational data store 112b) and used to store current and historical data and to create analytical report(s) for advanced enterprise knowledge. Data passed through the enterprise data store may also involve cleansing to ensure data quality and usage. ETL may also be used, as well as other techniques, involving staging, data integration, and access features. Ultimately, data in the enterprise data store may be transformed and catalogued so that it may be used for data mining, analytics, and other business intelligence purposes, such as marketing, decision support, etc. Other data stores may also be provided in the analytics layer 111, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the integrated monitoring and communications system 100 and/or run one or more application that utilize data from the integrated monitoring and communications system 100. Other various server components or configurations may also be provided.

The analytics layer 111 may further include a variety of servers 113a and 113b that facilitate, coordinate, and manage information and data. For example, the servers 113a and 113b may include any number or combination of the following servers: exchange servers, content management server, application servers, database servers, directory servers, web servers, security servers, enterprise servers, and analytics servers. Other servers to provide integrated monitoring and communications may also be provided.

The analytics layer 111 may also include an analytics system 200. The analytics system 200 may include various layers, processors, systems or subsystems. For example, the analytics system 200 may include a data access interface 202, a processor 203, a data management subsystem 208, a computation management subsystem 214, and an output interface 222. Other layers, processing components, systems or subsystems, or analytics components may also be provided.

There may be several examples of hardware that may be used for the servers, layers, subsystems, and components of the analytics system 200 or the integrated monitoring and communications system 100. For example, the processor 203 and/or computation management subsystem 214 may comprise an integrated circuit, and may execute software or firmware or comprise custom processing circuits, such as an application-specific integrated circuit (ASIC) or field-programmable gate array (FPGA). The data access interface 202 and output interface 222 may be any number of hardware, network, or software interfaces that serves to facilitate communication and exchange of data between any number of or combination of equipment, protocol layers, or applications. For example, the data access interface 202 and output interface 222 may each include a network interface to communicate with other servers, devices, components or network elements via a network in the integrated monitoring and communications system 100. More detail of the analytics system 200 is provided in FIG. 2.

The integrated monitoring and communications system 100 may also include an applications layer 121. The applications layer 121 may include any number or combination of systems and applications that interface with users or user-interfacing tools in an enterprise or IoT environment. For example, the applications layer 121 may include statistical analysis applications 122, reporting applications 123, web and mobile applications 124, and enterprise applications 125.

The statistical analysis applications 122 may include systems or applications that specialize in statistical calculations or econometrics. These may include, but not limited to, those by Tableau®, Domo®, Salesforce®, JMP®, MATLAB®, QlikSense®, SPSS®, SAS®, Stata®, Alteryx®, Analytica®, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc.

The web and mobile applications 124 may include Internet-based or mobile device based systems or applications of various users, namely those in an enterprise environment. The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In an example, these enterprise applications 125 may be external or remote to the analytics layer 111. Again, the application layer 121 may also provide a source of valuable information for the analytics system 200.

It should be appreciated that a layer, as described herein, may include a platform and at least one application. An application may include software comprised of machine-readable instructions stored on a non-transitory computer readable medium and executable by a processor. The systems, subsystems, and layers shown in FIG. 1 may include one or more servers or computing devices. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the gateway 107, servers 113*a* and 113*b*, and/or other servers within the systems, layers, and subsystems of the integrated monitoring and communications system 100. However, it should be appreciated that multiple servers may be used for each of these servers, and the servers may be connected via one or more networks. Also, middleware (not shown) may be included in the integrated monitoring and communications system 100 as well. The middleware may include software hosted by one or more servers. Furthermore, it should be appreciated that some of the middleware or servers may or may not be needed to achieve functionality. Other types of servers, middleware, systems, platforms, and applications not shown may also be provided at the back-end to facilitate the features and functionalities of the integrated monitoring and communications system 100.

Within the integrated monitoring and communications system 100, there may be a large amount of data that is exchanged, and the exchanged data may contain data related to performance, health, and activity of many products and systems in or outside of enterprise control. Many of the conventional techniques to use or process the data, as described above, are limited. They do not adequately or reliably provide solutions to complex questions. Referring back to the example of the bad smell in a factory, a more robust approach to adequately process, transform, and utilize this information for meaningful impact on asset management actions may be needed. The integrated monitoring and communications system 100, described herein, may solve this technical problem by using knowledge graph based explanatory equipment management.

Figure 2:
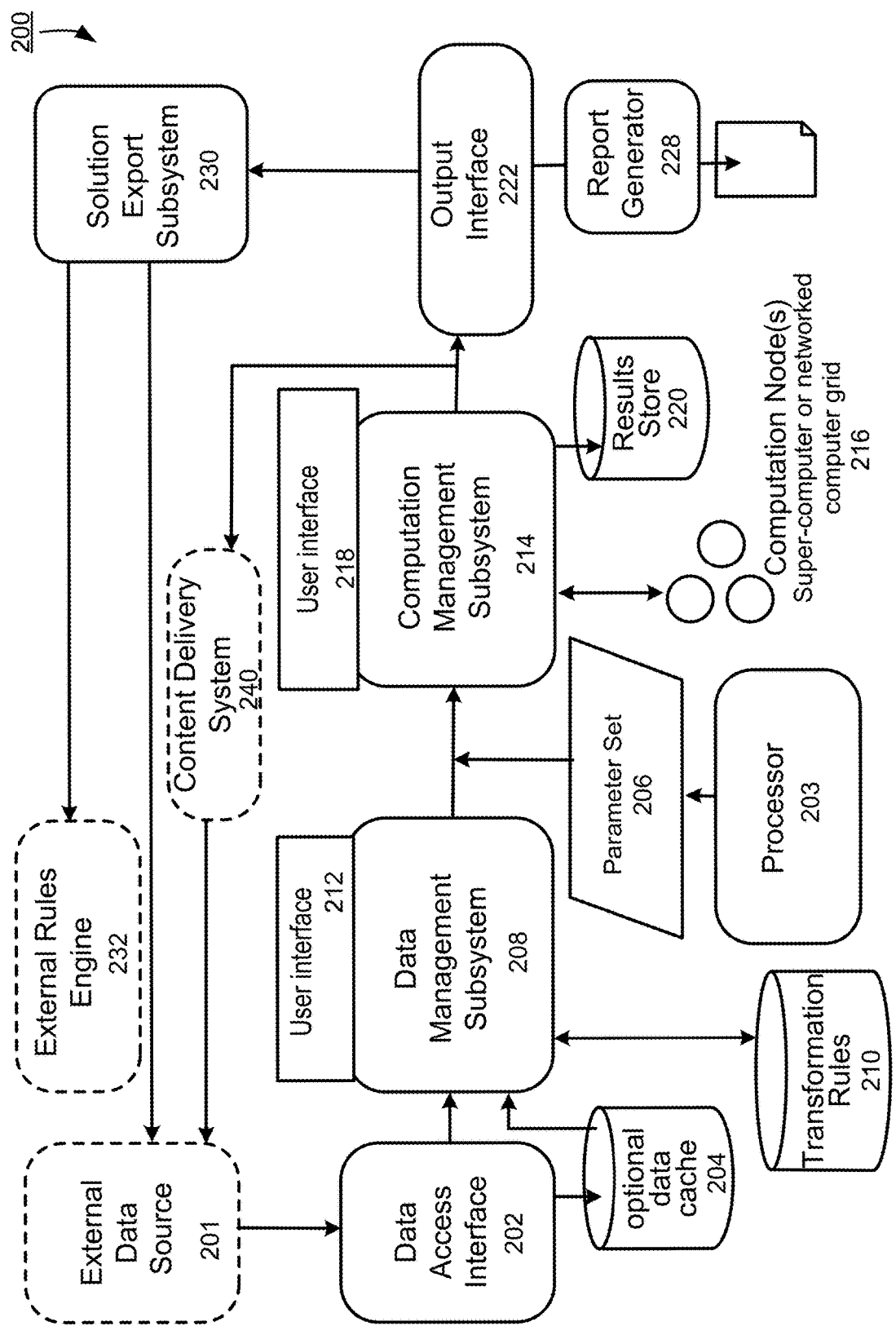
FIG. 2 shows an analytics system for knowledge graph based explanatory equipment management, according to an example.

FIG. 2 shows an analytics system for knowledge graph based explanatory equipment management, according to an example. Although the analytics system 200 shown in FIG. 2 is depicted in an integrated manner, it should be appreciated that the analytics system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the analytics system 200 may provide knowledge graph based explanatory equipment management. In an example, the analytics system 200 may be an integrated system as part of the analytics layer 111 shown in FIG. 1.

In the example of FIG. 2, data may be accessed from an external data source 201 by a data access interface 202. The external data source 201 may be any data source from the data source layer 101, analytics layer 111, and applications layer 121 of the integrated monitoring and communications system 100 of FIG. 1, as well as other data sources not depicted. The data access interface 202 may optionally store some or all (or none) of the data in an optional data cache 204, which may be local or remote. It should be appreciated that data acquired for knowledge graph generation may involve open semantic databases, more reputable sources of web content, open crawl databases, or other similar source. This may be based on the semantic nature of a knowledge graph. In other words, meaning of data may be encoded alongside data in a graph, usually in an ontological form. Because a knowledge graph is self-descriptive, it may be important to use higher quality sources to make the necessary relationships, as described in more detail below.

The imported data may then be passed to a data management subsystem 208 for processing prior to performing analytics. For example, data collected at the data source layer 101 may be in various formats. Thus, the data management subsystem 208 may organize the data by grouping, ordering, transforming, or cleaning the data in such a way that facilitates input of the data into analytics processing. It should be appreciated that the data management subsystem 208 may perform these features alone or in conjunction with other components of the analytics layer 111, such as the servers 113a and 113b. The data management subsystem 208 may use one or more transformation rules that specify one or more rules to apply to the data for processing. In an example, the transformation rules may be accessed from storage (e.g., from data store 210). Additionally or alternatively, the transformation rules may be input by a user. For example, the data management subsystem 208 may provide a user interface 212 that enables the user to specify one or more transformation rules. The data management subsystem 208 may also implement data management without rules (e.g., non-rule-based) and rely on other data management schemes.

The data management subsystem 208 may identify different types of variables that are specified by the user, and separate the variables according to the identified type. Some types of variables may be used as inputs to the analytics process, while other types of variables may be used evaluation criteria to evaluate the resulting analytics solutions. As such, the system may enable not only automated processing of data, but also automated evaluation of the resulting analytics solutions.

The variables determined by the data management subsystem 208 and a parameter set 206 generated by the processor 203 may be provided to the computation management subsystem 214. The computation management subsystem 214 may send the processed data including the parameter set 206 and one or more chosen algorithms to one or more computational nodes 216 to perform computational operations. The computation management subsystem 214 may generate knowledge graphs, perform clustering operations, execute classification, and/or perform other analytics or machine-learning actions.

Classification may provide assignment of instances to pre-defined classes to decide whether there are matches or correlations. Clustering may use groupings of related data points without labels. A knowledge graph may provide an organized graph that ties nodes and edges, where a node may be related to semantic concepts, such as persons, objects, entities, events, etc., and an edge may be defined by relations between nodes based on semantics. It should be appreciated that, as described herein, the term "node" may be used interchangeably with "entity," and "edge" with "relation."

Once imported data is transformed by the data management subsystem 208 and variables determined, the computation management subsystem 214 may apply a heuristic approach, such as a text parsing or processing based on regular expressions, including natural language processing (NLP) techniques. For audio, machine translation may be used to convert audio to natural language text. For images or videos, metadata may be used for basic heuristic processing. In another example, the computation management subsystem 214 may apply deep learning techniques that may pull in various classification, clustering, and/or metrics-based approaches. These approaches may be self-driven or may be supervised. In some examples, supervised learning algorithms may utilize target driver variables specified by the user to facilitate searching for particular solutions, among the potentially many solutions generated by the computation nodes 216, that are meaningful to the user. The computation management subsystem 214 may also provide a user interface 218 that shows the user the progress of knowledge graph generation.

An output interface 222 may also be provided. The output interface 222 may output the generated knowledge graph. Accordingly, the output interface 222 may also include a visualization interface that may present knowledge graphs and other information pertaining to the knowledge graph. A report generator 228 may generate report regarding the knowledge graphs.

In some implementations, the visualization interface may also provide a variety of evaluation results, for example, to a solution export subsystem 230. The solution export subsystem 230 may provide feedback information to the analytics system 200 or other systems in the integrated monitoring and communications system 100. For example, the solution export subsystem 230 may provide feedback information to an external rules engine 232 (or other feedback component), which may, for instance, use the feedback information to adapt one or more transformation rules. Additionally or alternatively, the solution export subsystem 230 may feedback information to the external data source 201, for instance, to adjust one or more variables or attributes in the data. In this way, the analytics system may be fine-tuned to provide improved and more accurate calculations and computations.

For example, the solution export subsystem 230 may be configured to export information regarding a knowledge graph to different types of external databases and external systems. In some implementations, the solution export subsystem 230 may be configured to export one or more rules or algorithms for semantic data, based on the knowledge graph that was generated. The rules or algorithms may enable external systems to apply those rules or algorithms to implement the generated knowledge graphs to various types of data stored on the external database. In some implementations, the system may obtain data from the external system, retune the knowledge graph based on the received data (such as changing variable selection or other changes), and send information regarding a revised knowledge graph to the external system. As such, in some implementations, the analytics system 200 may enable more than just an analytics tool, but also enable a feedback-based and connected enterprise system.

It should be appreciated that once the output interface 222 provides the knowledge graph and results of the evaluation, the report generator 228 may generate a report to be output to a user, such as a security manager or other user. The report may include various types of information, such as the knowledge graph itself, an evaluation of the knowledge graph or other calculations, and may enable a user to adjust one or more variables of the analytics system 200 to fine-tune operations, as described herein.

By providing an analytics technique based on knowledge graphs, the analytics system 200 may enable the user to analyze the details and nuances of many (e.g., dozens of) solutions at the same time in an explanatory fashion. For example, referring back to the example described above regarding a factory setting where Room B is exhibiting a "bad smell," the integrated monitoring and communication system 100, together with the analytics system 200, may receive an inquiry from a factory operator about this specific issue and provide a reply that addresses, in an explanatory format, exactly why Room B smells bad, using the information gathered and processed. A knowledge graph based analytics system may allow a user to explore a large number nodes and semantic relationships efficiently in less time than it would take a typical practitioner to evaluate. In this way, the analytics system 200 may incorporate a whole host of media and information, in a heterogeneous manner, that results in a more efficient and more intuitive way of monitoring and managing assets and equipment.

It should be appreciated that a knowledge graph may have a flexible structure and offer many advantages over other forms of analytics. For example, knowledge graphs are semantic, where meaning of data may be encoded alongside data in a graph, or form of an ontology. In other words, a knowledge graph is self-descriptive and provides a single place to find data and understand what that data is all about. Moreover, because a knowledge graph is semantic, queries may be submitted in a style much closer to natural language. It, therefore, enables a smarter search, makes for more efficient discovery, and narrows any communication gaps between data providers and consumers. Furthermore, since the underlying basis of a knowledge graph is the ontology, which specifies the semantics of data, a knowledge graph may be based on logical formalisms, which may support a variety of inferences or educated guesses. Because knowledge graphs are graphs by nature and provide a visual representation, this may also allow various graph-computing techniques and algorithms to add additional intelligence over stored data. Lastly, a knowledge graph may be easily updatable and may change with newly-infused data. Data growth is important, especially when dealing with heterogeneous sources. A knowledge graph may therefore support a continuously running pipeline of information, adding to the graph, refining the graph, all as new information continues to arrive. And by capturing diverse meta-data annotations, such as provenance or versioning information, this may make knowledge graphs ideal for dynamic data sets for integrated monitoring and communications of diagnostic equipment.

Accordingly, the analytics system 200 may provide monitoring, diagnostics, and analytics for a number of IoT-based applications and systems using knowledge graph based explanatory equipment management.

FIG. 3 illustrates a data flow diagram 300 for knowledge graph based explanatory equipment management. In an example, a user may provide an input 301. The input 301 may be an inquiry, which allows the user to interact with a knowledge graph 302. Block A may provide details of how the user may provide the input 301 and interact with the knowledge graph 302, which is shown in FIGS. 4A-4D. The knowledge graph 302 may be generated by a knowledge graph generator 303, which may use a variety of hetergenous data sources. Block B may provide more details of how the knowledge graph generator 303 collects data and generates the knowledge graph, which is shown in FIG. 5. Once the inquiry is submitted and the knowledge graph queried, an output generator 304 may provide an explanatory response to the initial query. This may also include confirmation 305 by a user. The user may be the same user who submitted the initial query or it may be another, such as an "expert," who may provide confirmation, verification, or feedback 306 to inform or update the knowledge graph 302. Details of this process may be provided in block C, which is shown in FIG. 6.

Figure 4A:
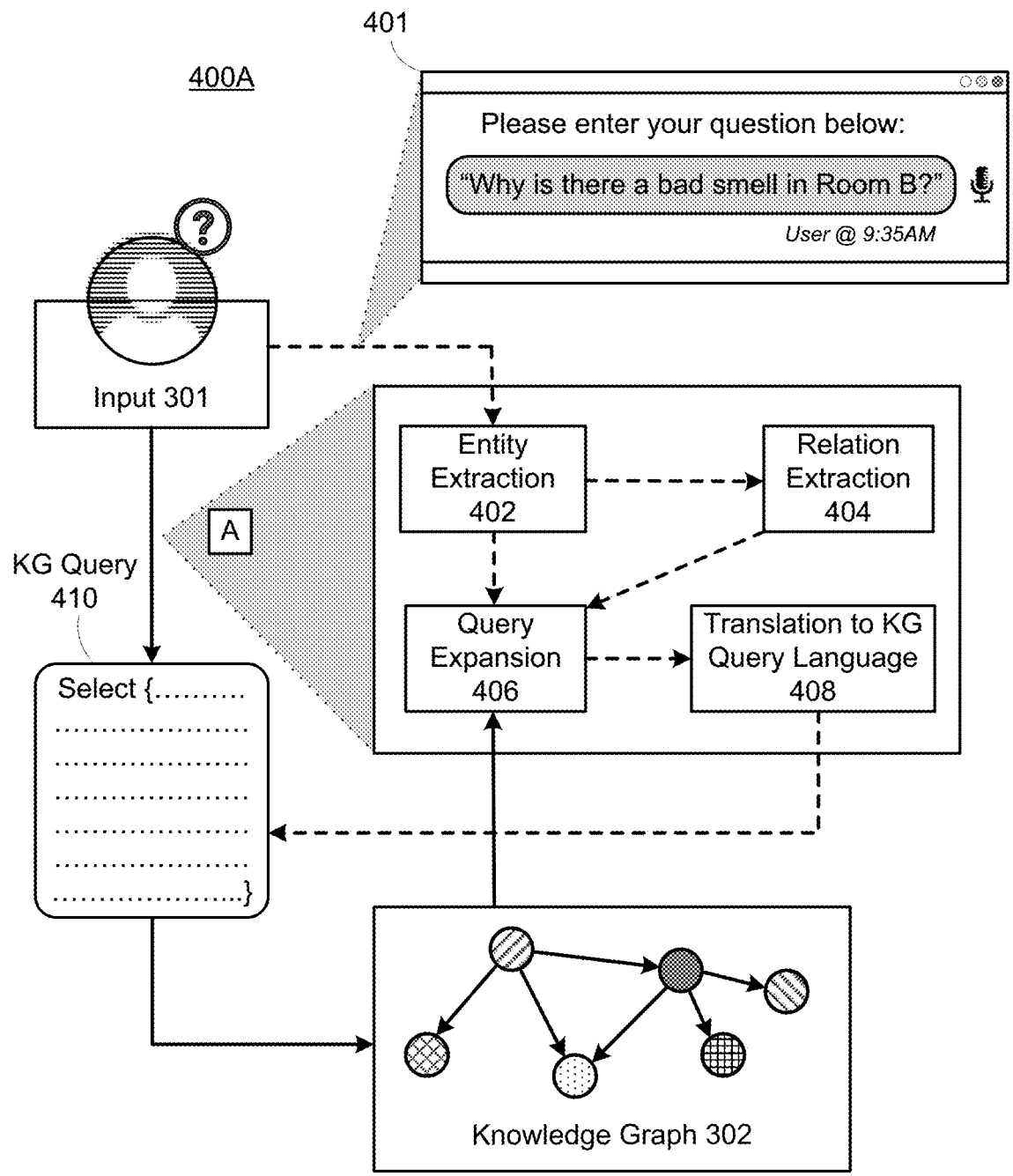
FIGS. 4A-4D illustrate a data flow diagram for data input and extraction, according to an example.

FIGS. 4A-4D illustrate a data flow diagram for data input and extraction. Referring to FIG. 4A and the factory example where a bad smell is emanating from Room B, a user may desire to figure out the cause of that smell and whether that smell is harmful. In the data flow diagram 400A of FIG. 4A, the user may provide an input 301 via an input interface 401 that asks the user to "Please enter your question below." In this example, the user may type his or her inquiry in a text format, e.g., using plain and natural language: "Why is there a bad smell in Room B?" It should be appreciated that the input may be entered in via text, but other formats may be acceptable as well, such as audio, visual, or other format. As described above, the analytics system 200 may either convert the input into text, use metadata associated with the input, or combination both or other techniques in order to process the input. In an example, natural language processing (NLP) techniques may be used. Other semantic-based techniques or input processing processes, such as those found in clustering or classification may also be provided. Once the inquiry is entered, the analytics system 200 may transform the input 301 into a knowledge graph (KG) query 410, which may be used to interact with the knowledge graph 302.

Figure 4B:
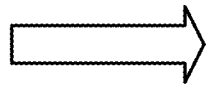
Figure 5:
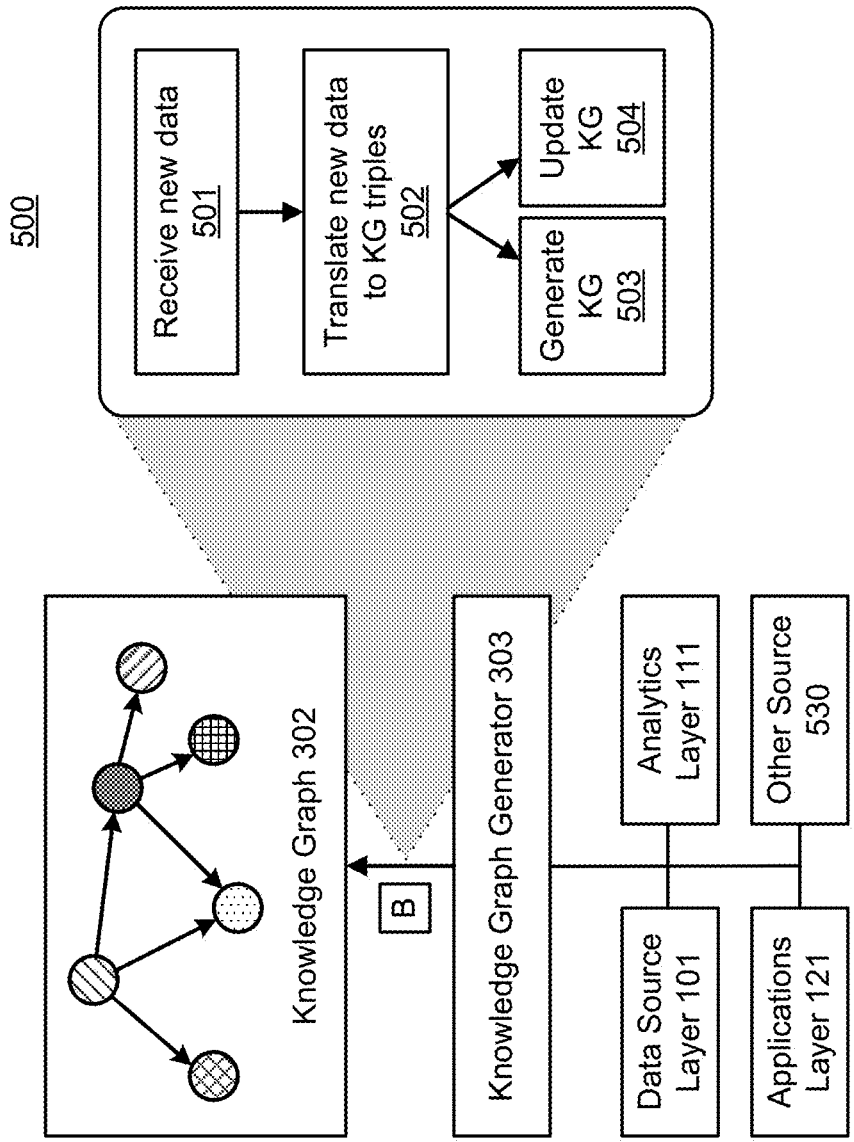
FIG. 5 illustrates a data flow diagram for knowledge graph generation, according to an example.

In order to transform the input 301 into a KG query 410, entity extraction 402 and relation extraction 404 may be performed by the analytics system 200 on the input 301. As shown in FIG. 4B, the input 301 may include the text inquiring, "Why is there a bad smell in Room B?" The analytics system 200 may parse that text and identify entities and relations, resulting in the following identification:

Relations={in};
Entities {smell bad, Room B}

Once the entities and relations are identified from the input 301, the analytics system 200 may perform a query expansion 406.

Figure 4C:
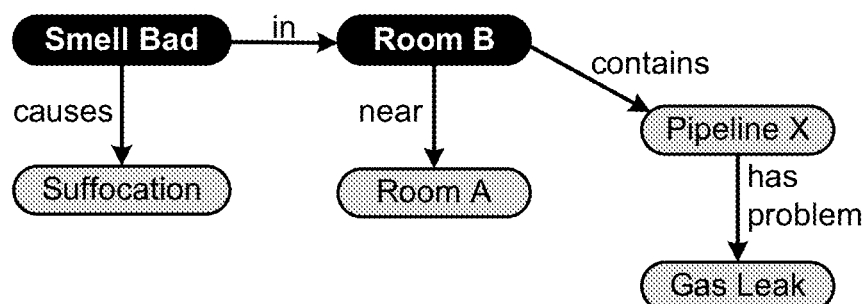

The query expansion 406 may take information from the nodes and edges, in this case the entities and relations, as well as information from the knowledge graph 302, and expand the original input 301 to include additional relevant entities and relations from the knowledge graph 302. As shown in FIG. 4C, the query expansion may identify the core entities and relations and tie them to other potentially relevant entities and relations. As depicted, "smell bad" may cause a harmful effect, such as "suffocation." "Room B" is also located near "Room A." It may also be known that Room B may contain "Pipeline X," which in turn may have previous problems with a "gas leak."

Figure 4D:
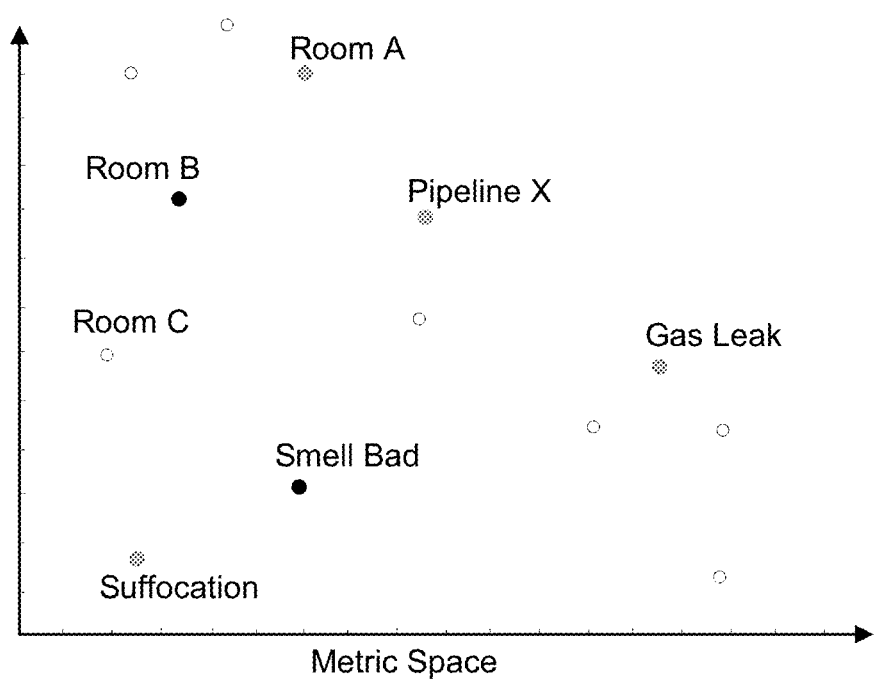

These entities and relations may be used to plot a metric space graph, as depicted in FIG. 4D. It should be appreciated that in mathematics, a metric space is a set for which distances between all members of the set are defined. Those distances, taken together, are called a metric on the set. A metric on a space induces topological properties like open and closed sets, which lead to more abstract topological spaces. While Euclidean (linear) metric space is most common, a variety of metric spaces may be employed, such as geometric (elliptic or hyperbolic), or other forms (e.g., hyperboloid, velocity-based, etc.). By plotting a metric space graph, the strength of connections between the nodes and edges, for example, may be more precisely determined.

Once the query expansion 406 occurs, the data originally derived from the input 301 may be translated to KG query language 408. The translated KG query 410 may then be used to determine an answer or response to the user inquiry, and the knowledge graph 302 may also be updated and refined.

FIG. 5 illustrates a data flow diagram 500 for knowledge graph generation. As depicted, the knowledge graph generator 303 may generate the knowledge graph 302 using a variety of data sources. These may include components from the data source layer 101, analytics layer 111, applications layer 121, or other data source 630 not depicted in FIG. 1. In most cases, data may largely be acquired from machines and sensor equipment as shown in FIG. 1. That said, information from other reliable sources may be used. Gathering information from a variety of heterogeneous data sources may enhance knowledge graph effectiveness and utilization, ultimately allowing the integrated monitoring and communications system 100 to provide a more efficient and more intuitive way of monitoring and managing assets and equipment.

As shown in block B, the knowledge graph generator 303 may create a knowledge graph in a variety of ways. In an example, the knowledge graph generator 303 may receive new data 501 from a variety of sources as described above. Once this data is received, the new data may be translated into knowledge graph (KG) "triples." A KG triple may be based on semantic triples, as used in an atomic data entity in a Resource Description Framework (RDF) data model. More specifically, a KG triple may be a set of three entities that codifies a statement about semantic data in the forms of subject-predicate-object expressions, e.g., "smells bad in Room B." This format may enable knowledge to be represented in a machine-readable way. In this case, a KG triple may allow the knowledge graph generator 303 to receive and process the data received and generate the knowledge graph 503 consistent with that data or update the knowledge graph 504.

Figure 6A:
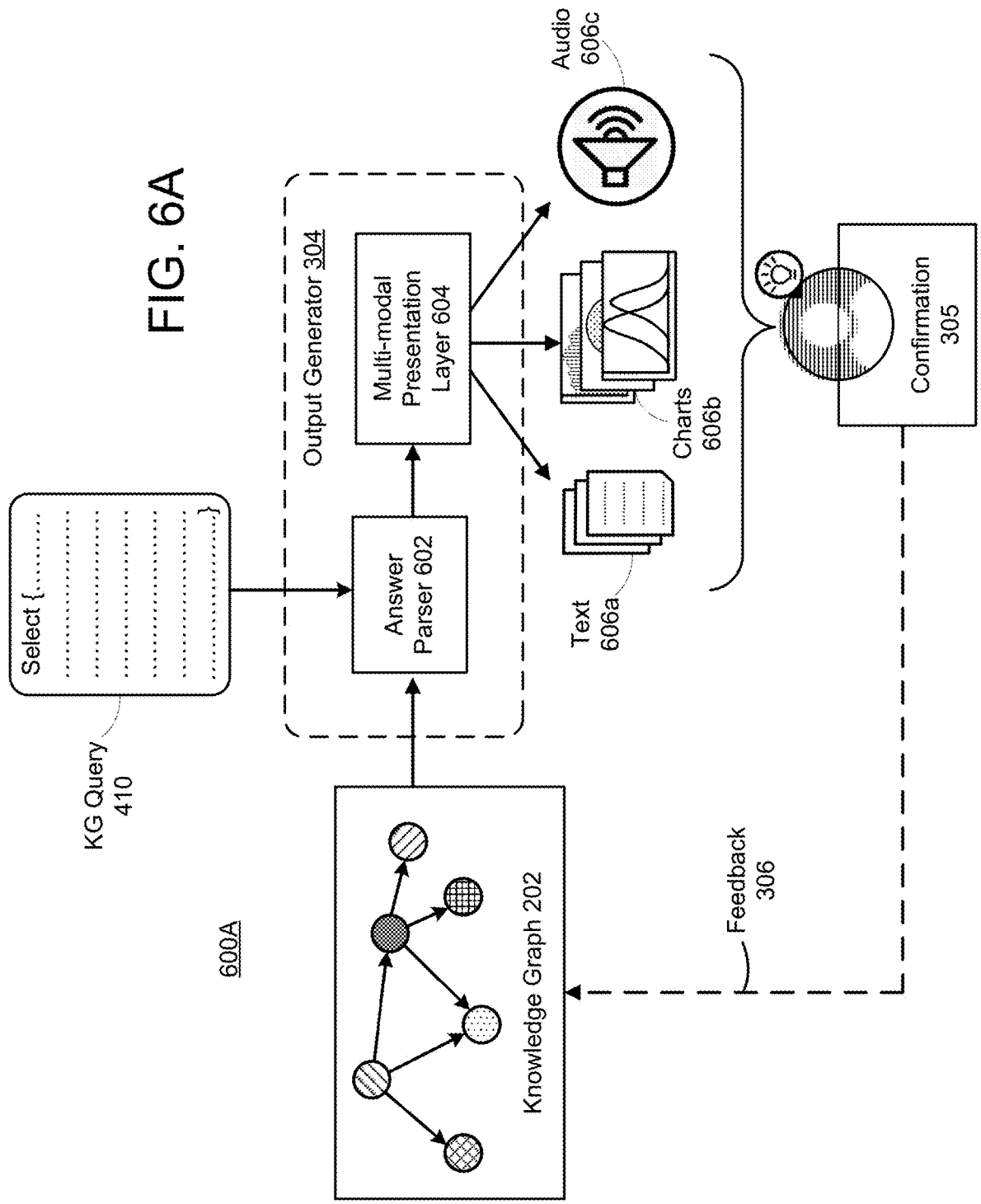
FIG. 6A illustrates a data flow diagram for knowledge graph output generation and confirmation, according to an example.

FIG. 6A illustrates a data flow diagram 600A for knowledge graph output generation and confirmation. The KG query 410 and knowledge graph 302 may be received at an answer parser 602 at the output generator 304. The answer parser 602 may provide syntax analysis by analyzing a string of symbols. In this case, the string of symbols may be natural language. In some other examples, the string of symbols may be code, data structures, or other communicative language. The answer parser 602 may break down the natural language into smaller units and attempt to piece back into a meaningful sentence, and in some instances, with the help of a sentence diagram or other linguistic tools or applications. The answer parser 602 may build a data structure, e.g., parse tree, syntax tree, or other hierarchical structure, to provide a structural representation of the input received. It should be appreciated that several types of parsing techniques may be used, such as a top-down, bottom-up, shift-reducing, recursive-descent, or other parsing models.

The answer parser 602 may transmit the data (now parsed) to a multi-modal presentation layer 604, which may provide at least on form of output. This may include text 606a, non-text visual, such as chart 606b, and/or audio 606c. The output may also be received a user device of a user, which may be human or automated, to provide confirmation, verification, or feedback 306. This feedback may inform the knowledge graph 302 of accuracy and reliability.

FIG. 6B illustrates an output visual 600B for knowledge graph output generation, according to an example. As previous shown in FIG. 3, the input interface 401 may ask a user to "Please enter your question below," and in that example, the user may type his or her inquiry in a text format, e.g., using plain and natural language: "Why is there a bad smell in Room B?" In FIG. 6B, the integrated monitoring and communications system 100, after performing the processes and techniques described above, may display in screen 612 the following response: "The bad smell is caused by a gas leak in pipeline X in Room B." This may be based on the knowledge graph 302 and the processing of data by the analytics system 200. The screen 612 may also provide a confirmation request. In this case, the user (human or automated) may confirm the validity of this response by clicking a radio button "Yes." Receiving confirmation (or lack thereof) may inform the knowledge graph 302 and/or knowledge graph generator 303 to provide more accurate and reliable output response for the user.

Figure 7:
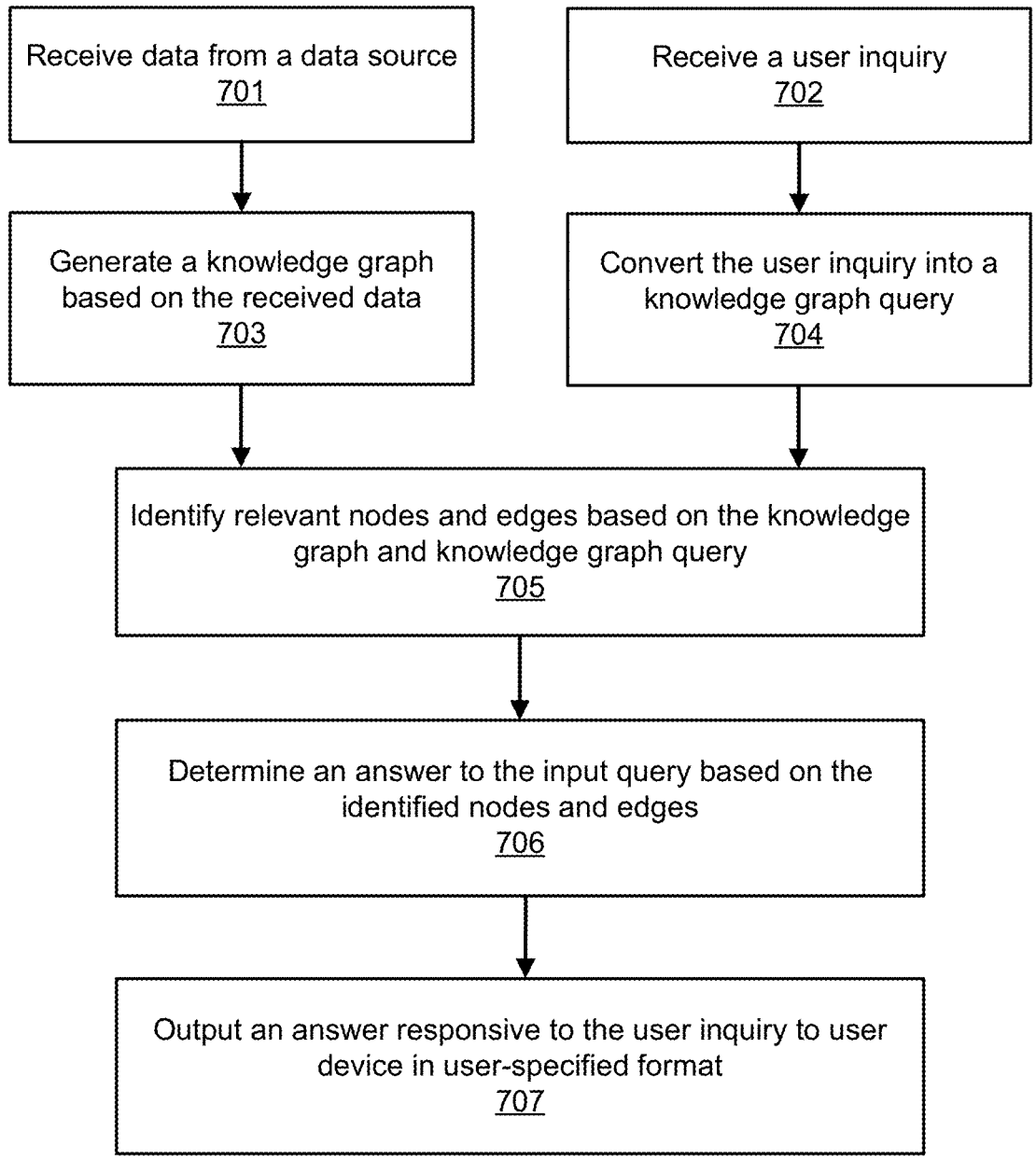
FIG. 7 illustrates a method for knowledge graph based explanatory equipment management, according to an example.

FIG. 7 illustrates a method for knowledge graph based explanatory equipment management, according to an example. The method 700 is provided by way of example, as there may be a variety of ways to carry out the method described herein. Although the method 700 is primarily described as being performed by system 100 as shown in FIG. 1 or system 200 as shown in FIGS. 1-2, the method 700 may be executed or otherwise performed by other systems, or a combination of systems. Each block shown in FIG. 6 may further represent one or more processes, methods, or subroutines, and one or more of the blocks may include machine-readable instructions stored on a non-transitory computer readable medium and executed by a processor or other type of processing circuit to perform one or more operations described herein.

At block 701, the data access interface 202 of the analytics system 200 may receive data associated with a system or product from a data source. In an example, the data may be heterogeneous data associated with performance of the system or product. In some examples, the data source may include a plurality of machine and sensor equipment. In other examples, the data source may include at least one of an enterprise resource planning (ERP) system, a document, a web feed, a sensor, a geolocation data source, an enterprise database, a public database, a server, an analytics tool, a mobile device, and a reporting system.

At block 702, the data access interface 202 may also receive a user inquiry pertaining to the system and product. The user inquiry may be converted to a text format for natural language processing (NLP).

At block 703, the processor 203 may generate a knowledge graph based on the data associated with the system or product.

At block 704, the processor 203 may convert the user inquiry into a knowledge graph query. This may begin by extracting entities from the user inquiry using NLP. In an example, the entity extraction may include natural language (NLP) processing. The entities may be directed to a subject or an object of the user inquiry.

The processor 203 may then extract relations from the user inquiry to identify relationships between the entities in the user inquiry. In an example, the relations may be directed to relationships or correlations of these one or more entities to each other.

The processor 203 may also expand the user inquiry based on the knowledge graph and the identified entities and relations. In an example, the query expansion may include plotting a metric space using the identified one or more entities and one or more relations to determine strength of relatedness of other entities and relations from the knowledge graph.

After the query expansion, the processor 203 may translate the expanded user inquiry into knowledge graph triples to generate the knowledge graph query.

At block 705, the processor 203 may identify relevant nodes and edges based on the knowledge graph query and the knowledge graph. At block 706, the processor 203 may determine an answer responsive to the user inquiry based on identified nodes and edges.

At block 707, an output interface 222 may transmit an answer to the user. The answer may be responsive to the user inquiry and presented in a user-specified format. In an example, the user-specified format may be a text format, an image format, an audio format, or a combination thereof. The answer may also include a confirmation request. The confirmation request may ask the user to provide a confirmation as to whether the answer is accurate. A user response—positive or negative—may be used as feedback to update the knowledge graph.

Although applications of knowledge graphs described herein are directed mainly to asset monitoring and management, it should be appreciated that that the integrated monitoring and communications system 100 may also use knowledge graphs in semantic searches, automated fraud detection, intelligent chatbots, advanced drug discovery, dynamic risk analysis, content-based recommendation engines, and other types of knowledge management system. The integrated monitoring and communications system 100 may also use classification algorithms and clustering schemes, together with knowledge graphs, to form a more comprehensive and flexible approach to predictive analytics and equipment management.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system for providing integrated monitoring and communications of diagnostic equipment, comprising:
   one or more data stores to store and manage data within a network;
   one or more servers to facilitate operations using information from the one or more data stores;
   an analytics system that communicates with the one or more servers and the one or more data stores to provide integrated monitoring and communications of diagnostic equipment in the network, the analytics system comprising:
      a data access interface to:
         receive data associated with diagnostic equipment of a system or product from a data source, wherein the data source comprises heterogeneous data from a plurality of machine and sensor equipment associated with the system or product; and
         receive a user inquiry, wherein the user inquiry pertains to at least one issue related to performance or health of diagnostic equipment of the system and product;
      a processor to:
         generate a knowledge graph based on the data associated with diagnostic equipment of a system or product, wherein the knowledge graph provides analytics-based information associated with the performance or health of diagnostic equipment of the system or product;
         convert the user inquiry into a knowledge graph query by:
            performing an entity extraction on the user inquiry to identify one or more entities in the user inquiry,
            performing a relation extraction on the user inquiry to identify one or more relations between the one or more entities the user inquiry,
            performing a query expansion using the knowledge graph and the identified entities and relations, and
            translating the user inquiry into knowledge graph triples based on the query expansion to generate the knowledge graph query;
         identify relevant nodes and edges based on the entities and relations using the knowledge graph and the knowledge graph query;
         determine and generate an answer to the user inquiry based on the identified nodes and edges in the knowledge graph, wherein the answer pertains to the performance or health of diagnostic equipment associated with the user inquiry; and
      an output interface to transmit to a user device the answer responsive to the user inquiry in a user-specified format.

2. The system of claim 1, wherein the data source comprises at least one of an enterprise resource planning (ERP) system, a document, a web feed, a sensor, a geolocation data source, an enterprise database, a public database, a server, an analytics tool, a mobile device, and a reporting system.

3. The system of claim 1, wherein the data source comprises heterogeneous data from manufacturing equipment.

4. The system of claim 1, wherein the user inquiry is communicated in at least one of a text format, an image format, and an audio format, and wherein the user inquiry is converted to text.

5. The system of claim 1, wherein the entity extraction comprises natural language (NLP) processing, and wherein the one or more entities are directed to a subject or object of the user inquiry and the one or more relations are directed to relations of these one or more entities to each other.

6. The system of claim 1, wherein the query expansion further comprises using the identified one or more entities and one or more relations to determine strength of relatedness of other entities and relations from the knowledge graph.

7. The system of claim 1, wherein the user-specified format is at least one of a text format, an image format, and an audio format.

8. The system of claim 1, wherein the answer further comprises a confirmation request for a user at the user device to provide a confirmation as to whether the answer is accurate, wherein the confirmation is used as feedback to update the knowledge graph.

9. A system for providing integrated monitoring and communications of diagnostic equipment, comprising:
   a data access interface to:
      receive data associated with diagnostic equipment of a system or product from a data source, wherein the data is heterogeneous data associated with at least a performance of the system or product, and wherein the data source comprises a plurality of machine and sensor equipment; and receive a user inquiry pertaining to at least one issue related to performance or health of diagnostic equipment of the system and product, wherein the user inquiry is converted to a text format for natural language processing (NLP);

a processor to:

generate a knowledge graph based on the data associated with the diagnostic equipment of system or product;

convert the user inquiry into a knowledge graph query by:

extracting entities from text of the user inquiry using NLP, wherein the entities are directed to a subject or an object of the user inquiry, extracting relations from text of the user inquiry to identify relationships between the entities in the user inquiry, expanding the user inquiry based on the knowledge graph and the identified entities and relations, and translating the expanded user inquiry into knowledge graph triples to generate the knowledge graph query;

identify relevant nodes and edges based on the knowledge graph query and the knowledge graph;

determine and generate an answer to the user inquiry based on identified nodes and edges, wherein the answer pertains to the performance or health of diagnostic equipment associated with the user inquiry; and an output interface to transmit an answer to a user at a user device, wherein the answer is responsive to the user inquiry and presented in a user-specified format.

10. The system of claim 9, wherein the data source comprises heterogeneous data from a plurality of machine and sensor equipment.

11. The system of claim 9, wherein the data source comprises at least one of an enterprise resource planning (ERP) system, a document, a web feed, a sensor, a geolocation data source, an enterprise database, a public database, a server, an analytics tool, a mobile device, and a reporting system.

12. The system of claim 9, wherein the entities are directed to the subject or object of the user inquiry and the relations are directed to relationship of these entities to each other.

13. The system of claim 9, wherein expanding the user inquiry further comprises using the identified entities and relations to determine strength of relatedness of other entities and relations from the knowledge graph.

14. The system of claim 9, wherein the user-specified format is at least one of a text format, an image format, and an audio format.

15. The system of claim 9, wherein the answer further comprises a confirmation request for the user to provide a confirmation as to whether the answer is accurate, wherein the confirmation is used as feedback to update or revise the knowledge graph.

16. A method for providing integrated monitoring and communications of diagnostic equipment, comprising:

receive data associated with diagnostic equipment of a system or product from a data source, wherein the data is heterogeneous data associated with at least a performance of the system or product, and wherein the data source comprises a plurality of machine and sensor equipment;

receive a user inquiry pertaining to at least one issue related to performance or health of diagnostic equipment of the system and product, wherein the user inquiry is converted to a text format for natural language processing (NLP);

generate a knowledge graph based on the data associated with diagnostic equipment of the system or product;

convert the user inquiry into a knowledge graph query by:

extracting entities from text of the user inquiry using NLP, wherein the entities is directed to a subject or an object of the user inquiry, extracting relations from text of the user inquiry to identify relationships between the entities in the user inquiry, expanding the user inquiry based on the knowledge graph and the identified entities and relations, and translating the expanded user inquiry into knowledge graph triples to generate the knowledge graph query;

identify relevant nodes and edges based on the knowledge graph query and the knowledge graph;

determine and generate an answer to the user inquiry based on identified nodes and edges, wherein the answer pertains to the performance or health of diagnostic equipment associated with the user inquiry; and output an answer to a user at a user device, wherein the answer is responsive to the user inquiry and presented in a user-specified format.

17. The method of claim 16, wherein the data source comprises heterogeneous data from at least one of an enterprise resource planning (ERP) system, a document, a web feed, a sensor, a geolocation data source, an enterprise database, a public database, a server, an analytics tool, a mobile device, and a reporting system.

18. The method of claim 16, wherein the entities are directed to the subject or object of the user inquiry and the relations are directed to relationship of these entities to each other.

19. The method of claim 16, wherein expanding the user inquiry further comprises using the identified entities and relations to determine strength of relatedness of other entities and relations from the knowledge graph.

20. The method of claim 16, wherein the user-specified format is at least one of a text format, an image format, and an audio format.

21. The method of claim 16, wherein the answer further comprises a confirmation request for the user to provide a confirmation as to whether the answer is accurate, wherein the confirmation is used as feedback to update or revise the knowledge graph.

22. A non-transitory computer-readable storage medium having an executable stored thereon, which when executed instructs a processor to perform the following:

receive data associated with diagnostic equipment of a system or product from a data source, wherein the data is heterogeneous data associated with at least a performance of the system or product, and wherein the data source comprises a plurality of machine and sensor equipment;

receive a user inquiry pertaining to at least one issue related to performance or health of diagnostic equipment of the system and product, wherein the user inquiry is converted to a text format for natural language processing (NLP);

generate a knowledge graph based on the data associated with diagnostic equipment of the system or product;
convert the user inquiry into a knowledge graph query by:
 extracting entities from text of the user inquiry using NLP, wherein the entities is directed to a subject or an object of the user inquiry,
 extracting relations from text of the user inquiry to identify relationships between the entities in the user inquiry,
 expanding the user inquiry based on the knowledge graph and the identified entities and relations, and
 translating the expanded user inquiry into knowledge graph triples to generate the knowledge graph query;
identify relevant nodes and edges based on the knowledge graph query and the knowledge graph;
determine and generate an answer to the user inquiry based on identified nodes and edges, wherein the answer pertains to the performance or health of diagnostic equipment associated with the user inquiry; and
output an answer to a user at a user device, wherein the answer is responsive to the user inquiry and presented in a user-specified format.

\* \* \* \* \*